Figure 1:
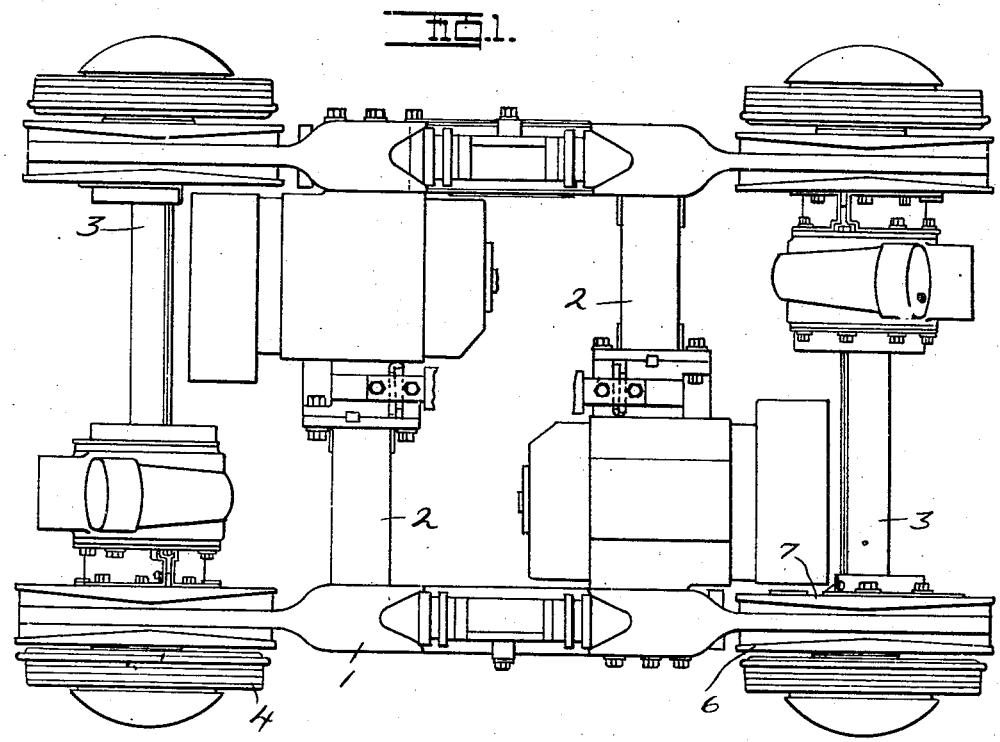

Dec. 8, 1942.  E. H. PIRON  2,304,201
VEHICLE TRUCK AND SUSPENSION SYSTEM THEREFOR
Filed April 3, 1935  2 Sheets-Sheet 1

Inventor
Emil H. Piron

Dec. 8, 1942.  E. H. PIRON  2,304,201
VEHICLE TRUCK AND SUSPENSION SYSTEM THEREFOR
Filed April 3, 1933  2 Sheets-Sheet 2
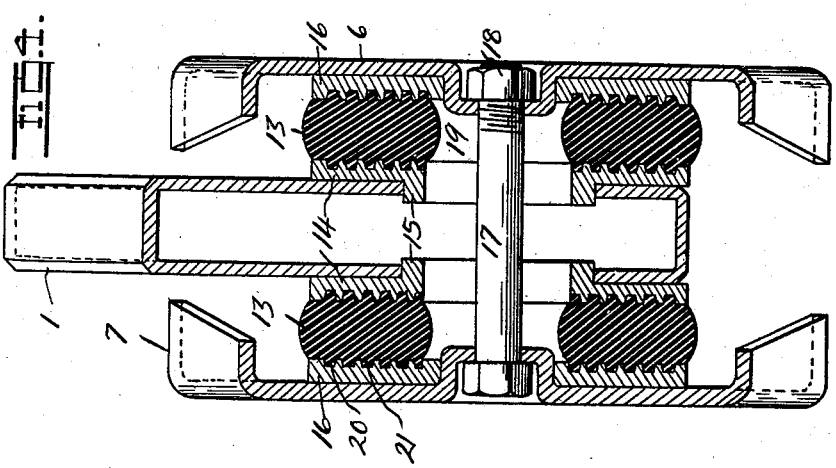
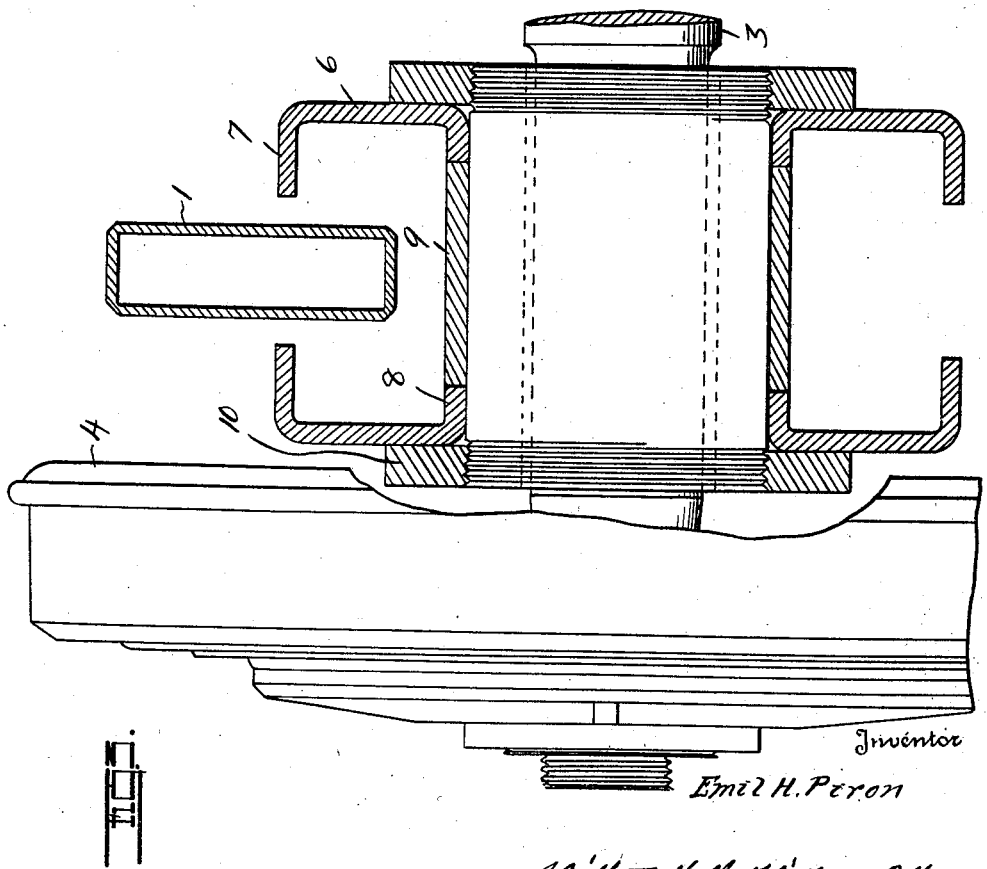
Inventor
Emil H. Piron
Attorneys Patented Dec. 8, 1942

2,304,201

UNITED STATES PATENT OFFICE 2,304,201

VEHICLE TRUCK AND SUSPENSION SYSTEM THEREFOR

Emil H. Piron, Highland Park, Mich., assignor, by mesne assignments, to Transit Research Corporation, New York, N. Y., a corporation of New York Application April 3, 1933, Serial No. 664,247

42 Claims. (Cl. 105—224.1)

The invention relates to suspension systems for vehicle axles and has for its object to provide an improved resilient suspension particularly adapted for use in supporting the truck frame of a rail vehicle from journal bearings.

Another object is to provide a frame as a constituent part of a rail vehicle truck which will be of a construction capable of resisting substantial deformation by stresses imparted thereto and which will therefore maintain all journal bearing supports in correct alignment.

In conventional practice, a coil spring on each bearing supports each side of the truck frame, the axle being guided in its vertical motion by abutments or rail members integral with the frame and engageable with each bearing. There is considerable clearance between each bearing for the axle and its guides so that upon a change in the velocity relation of the frame and the axle such as occurs, for instance, upon starting or at the moment following the application of a decelerating force, there is an impact of the bearing against one of its guides which causes wear at the contacting surfaces and which sets up oscillations liable to cause high stresses in the bearing, in the axle and in the frame. The journal bearing assembly is also capable of a small amount of motion transversely of the frame as permitted by the same guides, and the axles are capable of considerable floating movement axially of their bearings and transversely of the truck, the transverse motion being due primarily to track irregularities and to the horizontal weaving motion of both the car body and the truck. Impacts of the bearing against the guides and impacts of the axle against the bearing result in or cause noise and set up oscillations in the axle, in the bearing and in the truck frame. It has been found impractical to eliminate the transverse movement of the axles with respect to the truck frame, but a cushioning of such movement is highly desirable. It is therefore an object of the invention to provide a support for a truck frame from its journal bearings which is yieldable vertically, fore and aft and transversely of the frame in order to eliminate lost motion clearances capable of permitting the creation of impulses between a journal bearing and the frame and which will eliminate high stresses expected to occur as a result of such impulses and impacts. According to this arrangement, the axle has no floating movement axially of its bearings.

These impacts produce noise through contact of metal to metal at the points of contact and also produce directly vibrations of high frequency in the side frames and other parts of the truck structure. Further, vibrations of these sorts in the truck produce sympathetic vibrations in different parts of the rail vehicle body structure. The results are both disagreeable noise of large volume and disagreeable vibrations, as of the floor, which add to the discomfort of passengers. In addition to this noise, the oscillations of audible frequency transmitted by the wheels to the axle are transmitted by the metallic coil springs to the frame, thereby increasing the intensity of the noise because of the additional masses vibrating in concert. Another object of the invention therefore is to provide a journal bearing support which, by the nature of its construction, will sound-insulate the axles from the truck frame.

More specifically, it is an object of this invention to provide a springing system between a journal bearing and its frame having its resilient elements composed of a non-metallic yieldable material, such as rubber. Since the previously mentioned quality of frame stiffness is comparative, the load deflection ratio of the frame in resisting distortion can be considerably greater than the load deflection ratio of the springs whereby a self steering of the truck becomes possible and feasible. Thus where conical wheels are employed if, say, the left wheel flange is closer to a rail than the right wheel flange, the radius of the surface of contact of the left wheel is larger than that of the right wheel and the tendency is for the left wheel to run ahead of the right one. It is therefore an object to provide a resilient restraining means against this tendency for one wheel to run ahead of the other, and to provide a comparatively stiff frame against which these resilient means may react without causing any substantial deformation thereof during the yielding of the resilient means. With such a frame when one axle is forced to assume an angular position with respect to its intended direction of travel the other axle of the same truck is not induced to assume a parallel position therewith. Hunting is therefore eliminated to the point that vastly increased speeds become possible and riding comfort is very greatly improved.

The springing motion of which a rail vehicle, such as a street car is capable is restricted to a relatively small amount. Since it is desirable to damp vibrations as close to their source as possible, it is desirable to employ a resilient wheel having as great an amount of resilient motion as possible. Since the amount of flexing by the wheel is quite definitely limited by various practical considerations, additional resiliency is necessary, so that journal spring devices and body spring devices are employed. If the car is to be equally comfortable, regardless of the load or number of passengers carried, the period of oscillation of its springing system must be constant— that is, the ratio of the load to $$\frac{\text{Increment of load}}{\text{Increment of deflection}} \text{ equals a constant}$$

Since there are other spring devices between the truck and the body, the wear and tear on axles, bearings, motors and driving mechanism are of more immediate importance as regards the journal spring devices than the comfort of the passengers. The set of conditions which will best serve these interests calls for a modification of the above ratio requirement with respect to the journal spring devices, so as to obtain a shorter period of oscillation under light loading and a longer period under heavy loading. In this manner, higher accelerations are imposed on the axles and axle assemblies under light loadings, but the accelerations of the impulses are reduced to a greater extent under heavy loadings when the stresses are higher than would be the case if passenger comfort alone were considered. Such a modification is a requirement that the ratio $$\frac{\text{Increment of load}}{\text{Increment of deflection}} \text{ equals a constant}$$

that is, that the load deflection curve be a straight line which is readily obtainable by employing the rubber in shear. It is therefore another object of this invention to provide journal bearing spring devices capable of sufficient resilience to comprise an intrinsic part of the car springing system and which are so constructed as to best assist in preserving the life of the various elements which compose the car truck.

Another object of this invention is to provide journal spring devices employing rubber cushioning elements and to maintain these elements in place between shear plate members by pressure of sufficient magnitude to set up a frictional engagement therebetween capable of obviating slippage of the rubber during operation of the spring devices, the frictional engagement being the sole bonding means so that the spring devices may be readily disassembled for replacement of the cushioning elements.

It is known that the riding qualities change as the wear of the wheel tread increases because of the alteration of leverage during transverse motion of the axles with respect to the car. It is therefore another object of the invention to provide means for regulating the compression on the rubber in order that the riding qualities may be maintained constant.

Figure 2:
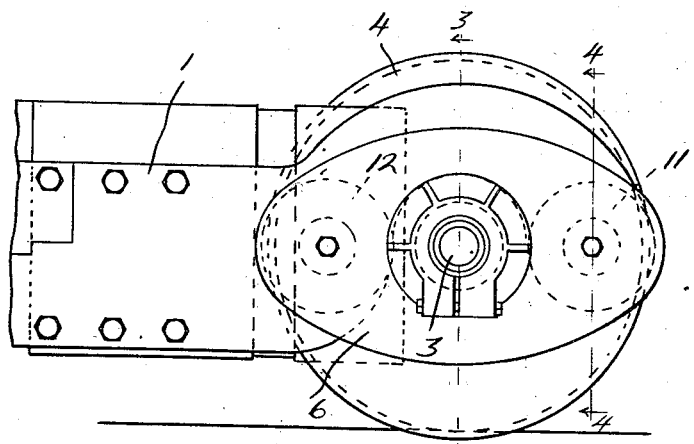

Other objects and advantages, either directly described or indirectly accruing from the favorable relation of parts will become hereinafter more fully apparent as reference is had to the accompanying drawings, wherein my invention is illustrated by way of example and not in a limiting sense, and in which Figure 1 is a plan view of a rail vehicle truck showing an embodiment of my invention;

Figure 2 is an enlarged side elevation of a portion thereof;

Figures 3 and 4 are cross sections respectively on the lines 3—3 and 4—4 of Figure 2.

The frame of the truck for a rail vehicle, as illustrated particularly in Figure 1, comprises the side girders 1 and the cross beams 2 connecting the side girders and preferably welded thereto. Both the side girders and the cross beams are preferably formed of sheet metal, such as sheet steel, and together form a rectangle intermediate the ends of the side girders, the latter extending past or beyond the rectangle, both fore and aft thereof, and comprising supports for the journal bearings in which the axles 3 are journaled. The axles are located fore and aft of the frame rectangle and each axle is journaled near its ends in a pair of journal bearings located at corresponding ends of the side girders. The rail engaging wheels 4 are secured to the end of the axles adjacent the journal bearings. With this construction, the truck frame, particularly by reason of its rectangle, is capable of offering a substantial resistance to distortion or deformation and maintains the journal bearing supports in correct alignment.

As shown more particularly in Figures 2, 3 and 4, 5 is one of the journal bearings over which one of the side girders 1 passes. The end portion or journal bearing supporting portion of this side girder is upwardly offset and its lower edge is curved to pass over the journal bearing and to provide for locating the axis of the journal bearing in the horizontal median plane of the main portion of the side girder and to also provide for space or clearance between the lower edge and the journal bearing.

The truck frame is yieldably supported upon the journal bearings by individual springing systems or spring devices and since each springing system or spring device is like the others, but one will be described. In detail, 6 are elongated plate members preferably of oval shape and formed of sheet metal and reinforced by the peripheral flanges 7. These plate members are on opposite sides of and spaced from the end portions of the side girder and the peripheral flanges extend toward the end portions. The central annular flanges 8 in axial alignment are formed upon the plate members and extend toward each other and encircle and have a close fit with the journal bearing 5. 9 is the sleeve also encircling the journal bearing and located between and forming a spacer for these annular flanges and 10 are nuts threaded upon the ends of the journal bearing and adapted to abut the plate members to draw the nut and plate members together in rigid assembly. 11 and 12 are pairs of resilient cushioning elements located respectively fore and aft and, as shown, are equidistant from the axis of the journal bearing 5 and preferably having their axes in the same horizontal plane as the axis of the journal bearing. These pairs of resilient cushioning elements connect the side girder to the journal bearing through the plate members and transmit the loading imposed on the side girder or the journal bearing to the journal bearing or side girder.

Each pair of resilient cushioning elements comprises the axially aligned circular masses or blocks of rubber 13 on opposite sides of the side girder with one rubber mass between the side girder and one of the plate members and the other rubber mass between the side girder and the other of the plate members. 14 are circular disks adjacent the side girder and having the central annular flanges 15 extending through aligned holes in the opposite side walls of the side girder and 16 are circular disks adjacent the plate members 6 with their axes registering with those of the rubber masses 13.

The plate members 6 are urged toward each other by the pair of bolts 17 and nuts 18 preferably equidistant from the journal bearing and also by the nuts 10. Each bolt 17 extends through the plate members 6 in approximate axial alignment with the rubber masses 13 and the disks 14 and 16. These rubber masses have the central holes 19 therethrough and the diameters of these holes and also the internal diameters of the annular flanges 15 are of sufficient size to provide ample clearance for the bolts. The bolts and nuts draw the plate members together to impose a substantial and continuous compression in a horizontal direction on the masses of rubber of sufficient magnitude to set up a frictional engagement between the masses of rubber and the disks 14 and 16 capable of obviating slippage of the rubber masses during operation without the necessity of other bonding means.

However, to resist undue slippage of the masses of rubber in case of accidentally severe loading, the disks 14 and 16 are corrugated, or, more particularly, provided with the concentric grooves 20 which are engaged by the concentric ribs 21 upon the rubber masses 13.

In operation, relative movement of the side girder and the journal bearing in any direction in a vertical plane and loading caused thereby is in a direction substantially normal to the direction of the clamping forces imposed by the bolts and nuts, so that the masses of rubber are subjected to sheer stresses, the disks 14 and also the disks 16 and the plate members 6 constituting shear members or plates. Transverse movement of the frame is resisted by compression of the rubber.

From the above description, it will be readily seen that I have provided an improved resilient suspension for use in supporting the truck frame from the journal bearings and that this resilient suspension comprises resilient supports or spring devices which are yieldable both in vertical and fore and aft directions and also in a direction transverse of the truck frame without any lost motion clearances. It will also be seen that due to the possible transverse movement of the bearings with respect to the frame, the requirement for the usual axial movement of the axles in the journals is relegated.

It will also be seen that each of the resilient supports or spring devices comprise resilient elements or cushioning means composed of non-metallic yieldable material serving to reduce acceleration of all impulses and to damp high frequency oscillations and thereby sound insulate the axles from the truck frame. It will be further seen that relative movement of the truck frame to a journal bearing in both vertical and fore and aft directions is resisted by the resilient elements or cushioning means in shear and that relative movement of a journal bearing to the truck frame transversely of the latter is resisted by these resilient elements or cushioning means in compression, thereby assisting in preserving the life of the various elements composing the truck. It will also be seen that each springing system or spring device is so constructed that the elements may be readily disassembled and replaced and that the compression on its resilient or cushioning elements may be readily changed as required by tread wear in order to maintain the desired riding qualities.

What I claim as my invention is:

1. In a truck for rail vehicles, an axle having a journal bearing, shear plates radiating from said bearing, a truck frame having a shear plate secured thereto and extending between the shear plates of said bearing, rubber elements between the frame plate and the bearing plates, and means for drawing said plates together to impose a substantial continuous compression on said rubber whereby relative vertical movement of said frame and said bearing is resisted by said rubber in shear under pressure.

2. In a truck for rail vehicles, an axle having a journal bearing, shear plates radiating from said bearing, a truck frame having a shear plate secured thereto and extending between the shear plates of said bearing, rubber cushioning elements between the frame plate and the bearing plates for resisting relative movement of said bearing and said frame in shear, and means for urging said plates toward each other with sufficient force to set up a frictional locking engagement of said rubber with said plates against relative slippage thereof during normal operation, said means being adjustable whereby the possible relative transverse movement of said axles with respect to said frame may be altered.

3. In a truck for rail vehicle, an axle having a journal bearing, shear plates radiating from said bearing, a truck frame having a shear plate secured thereto and extending between the shear plates of said bearing, rubber cushioning elements between the frame plate and the bearing plates for resisting relative movement of said bearing and said frame in shear, and means for urging said plates toward each other with sufficient force to set up a frictional locking engagement of said rubber with said plates against relative slippage thereof during normal operation, said plates and said rubber each being corrugated to resist undue slippage of said rubber on said plates in case of accidentally severe loading.

4. In a truck for rail vehicles, an axle having a journal bearing, elongated spaced plate members radiating from said bearing in slidable engagement therewith, a truck frame having a side girder extending between said plate members, said girder being curved at its lower edge to pass over said bearing in spaced relation therewith, rubber cushioning elements between said elongated plates and said girder both fore and aft of said bearing, and means concentric with said bearing for urging said elongated plates toward each other to impose pressure on said rubber elements.

5. In a truck for rail vehicles, an axle having a journal bearing, spaced oval plate members radiating from said bearing in slidable engagement therewith, a truck frame having a side girder extending between said oval members, said girder being curved at its lower edge to pass over said bearing in special relation therewith, a rubber toroid between said girder and each of said oval plates both fore and aft of said bearing, two bolts each having a head abutting one of said oval members and extending through said girder, the center of said toroids and the other of said oval members for urging said oval plates toward each other, said toroids and said girder having openings therethrough of sufficient size to permit the desired relative movement of said plates and said girder, and nuts concentrically of said bearing for urging said oval plates toward each other whereby said rubber, said plates and said girder are maintained in compressed assembly.

6. In combination, in a rail truck, a truck frame, an axle assembly including an axle and axle journal bearings from which said frame is supported, and rubber-like springing means arranged to resist all relative movement between said journal bearings and said frame, relative vertical movements therebetween being resisted in shear.

7. In combination, in a rail truck, a truck frame, an axle assembly including an axle and journal bearings from which said frame is supported, and an elastic means associated with said journal bearing arranged to resist vertical loading by said frame in straight shear, said elastic means also permitting and resisting relative horizontal movement between said journal bearings and said frame.

8. In combination, in a rail truck, a truck frame, a plurality of axle assemblies each including an axle and journal bearings from which said frame is supported, and an elastic mounting between said axle assembly and said frame having a substantially constant load deflection ratio vertically for resisting the gravity loading of said frame on said journal bearings and less resiliency laterally for resisting the lateral movement of said frame with respect to said journal bearings.

9. In combination, in a rail truck, a truck frame, an axle assembly including an axle and journal bearings from which said frame is supported, said axle being held from longitudinal movement with respect to said journal bearings, and spring means between said axle assembly and said frame constituting the sole resistance to movement between said frame and said journal bearings and having a substantially constant load deflection ratio vertically for resisting the gravity loading of said frame on said journal bearings and less resiliency laterally for resisting the lateral movement of said frame with respect to said journal bearings.

10. In combination, in a rail truck, a truck frame, an axle assembly including an axle and an axle journal bearing from which said frame is supported and resilient supporting means between said frame and axle assembly of substantially vertical resiliency for yieldingly resisting gravity loading imposed thereon by said frame and also yieldingly resisting all horizontal movements of said journal bearing with respect to said frame, said axle being retained in said journal bearing from axial sliding movement with respect thereto.

11. In combination, in a rail truck, a truck frame, an axle assembly including an axle and journal bearings from which said frame is supported, said axle being retained in said journal bearings against axial sliding with respect to said frame, and resilient supporting means between each of said bearings and said frame, said means being yieldable in a vertical direction, in a fore and aft direction relative to said frame, and in a lateral direction relative to said frame and yieldingly resisting the gravity loading imposed thereon by said frame, the fore and aft movements of said bearings with respect to said frame and the lateral movement of said frame with respect to said bearings.

12. In combination, in a rail vehicle, a truck frame, an axle assembly including wheels, an axle, and axle journal bearings from which said frame is supported, and resilient supporting means between said axle assembly and said frame having a substantially constant load deflection ratio vertically and substantially less lateral resiliency and also resiliency in a fore and aft direction relative to said frame for resisting vertical loading of said frame on said bearings, lateral movement of said bearings with respect to said frame, and fore and aft movement of said bearings with respect to said frame.

13. In combination, in a rail truck, a truck frame, an axle assembly including an axle and journal bearings from which said frame is supported, said axle being arranged against axial sliding in said bearings, and resilient cushioning means between said bearings and said frame having a substantially constant load deflection ratio, a lateral resiliency, and a fore and aft resiliency for resisting the vertical loading of said frame on said bearings, relative lateral movement of said frame with respect to said bearings, and relative fore and aft movement of said frame with respect to said bearings said cushioning means constituting the sole resistance to relative movement between said journal bearings and said frame.

14. In combination, in a rail vehicle, a truck frame, an axle assembly including wheels, an axle, and axle journal bearings from which said frame is supported, and resilient springing means for supporting said frame from said axle, comprising load imposing means carried by said frame, load receiving means secured to said bearings, and rubber springing elements between said load imposing and said load receiving means, said load imposing means imposing shear on said rubber elements by vertical loading and compression on said rubber elements upon lateral movement of said bearings and load receiving means with respect to said frame.

15. In combination, in a rail truck, a truck frame, an axle assembly including wheels, an axle, and axle journal bearings from which said frame is supported, and resilient means for supporting said frame from said bearings, comprising load imposing members carried by said frame, load receiving members secured to said bearings, rubber cushioning elements between said load imposing and load receiving members, and means for drawing said load imposing and load receiving members toward each other to impose a continuous compression on said rubber elements, said load imposing members imposing a shear on said rubber elements in response to vertical loading by said frame and additional compression on said rubber elements in response to lateral motion of said bearings and said load receiving members with respect to said frame.

16. In combination, in a rail truck, a truck frame, an axle assembly including wheels, an axle, and axle journal bearings from which said frame is supported, and resilient means for supporting said frame from said bearings, comprising load imposing members carried by said frame, load receiving members secured to said bearings, rubber cushioning elements between said load imposing and load receiving members, and means for drawing said load imposing and load receiving members toward each other to impose continuous compression on said rubber elements, said load imposing members imposing a shear on said rubber elements in response to vertical loading by said frame and additional compression on said rubber elements in response to lateral motion of said bearings and said load receiving members with respect to said frame, said rubber elements also resisting all relative fore and aft movement of said load imposing members with respect to said load receiving members.

17. In combination, in a rail truck, a truck frame, an axle assembly including an axle and journal bearings from which said frame is supported, and springing means between each of said bearings and said frame, comprising load receiving members secured to said bearings, at least one load imposing member secured to said frame, and a plurality of resilient elements separating said load imposing and load receiving members, one of said resilient elements residing forwardly of said bearings and another of said resilient elements residing rearwardly of said bearings, said resilient elements yieldably resisting relative lateral and vertical movement between said frame and said bearings.

18. In combination, in a rail truck, a truck frame, an axle assembly including an axle and journal bearings from which said frame is supported, and springing means between each of said bearings and said frame, comprsing load receiving members secured to said bearings, at least one load imposing member secured to said frame and a plurality of rubber elements separating said load imposing and load receiving members, one of said rubber elements residing forwardly of said bearings and another of said rubber elements residing rearwardly of said bearings and yieldably resisting relative horizontal and vertical movement between said frame and said bearings.

19. In combination, in a rail truck, a truck frame, an axle assembly including an axle and a journal bearing from which said frame is supported, and springing means between said bearing and said frame comprising load receiving members secured to said bearing, load imposing members secured to said frame, and resilient elements between said load imposing and load receiving members, one of said resilient elements residing forwardly of said bearing, another of said resilient elements residing rearwardly of said bearing, said elements yieldably resisting relative lateral and fore and aft movement of said bearing with respect to said frame.

20. In combination, in a rail truck, a truck frame, an axle assembly including an axle and journal bearings from which said frame is supported, springing means between said bearings and said frame, comprising load receiving members secured to said bearings, load imposing members secured to said frame, and elastic cushioning elements between said load imposing and load receiving members, one of said elements residing forwardly of each of said bearings and another of said elements residing rearwardly of each of said bearings, said elements receiving the vertical loading of said frame on said bearings and also yieldably resisting all horizontal movements of said frame relative to said bearings.

21. In combination, in a rail truck, a truck frame, an axle assembly including an axle and journal bearings from which said frame is supported, and springing means associated with said journal bearings comprising at least one load receiving member secured to each of said journal bearings and residing both fore and aft of said axle, at least one load imposing member secured to said frame and resilient springing elements residing between said load imposing and load receiving elements, one of said resilient springing elements residing forwardly of said axle and another residing rearwardly thereof, said resilient springing elements being composed of rubber and acting to yieldably resist all relative horizontal movements of said load imposing and load receiving members, both laterally and fore and aft with respect to said frame.

22. In combination, in a rail truck, a truck frame, an axle assembly including an axle and journal bearings from which said frame is supported, and springing means associated with said journal bearings, comprising load receiving members secured to said journal bearings and residing both fore and aft of said axle, at least one load imposing member secured to said frame and resilient springing elements residing between said load imposing and load receiving elements, one of said resilient springing elements residing forwardly of said axle and another residing rearwardly thereof, said resilient springing elements being composed of rubber and acting to yieldably resist all relative horizontal movements of said load imposing and load receiving members, both laterally and fore and aft with respect to said frame, and means for drawing said load imposing and load receiving members toward each other to impose continuous compression on said resilient springing elements.

23. In combination, in a rail truck, a truck frame, an axle assembly including an axle and journal bearings from which said frame is supported, and springing means associated with said journal bearings, comprising metallic load receiving members carried by said bearings and residing forwardly and rearwardly of said axle, at least one load imposing member carried by said frame and residing at the same approximate height as said load receiving members, rubber springing elements residing between said load imposing and load receiving members, one of said rubber elements residing forwardly of said axle and another of said rubber elements residing rearwardly of said axle, and means for drawing said load imposing and load receiving members together to impose continuous compression on said rubber elements, said rubber elements supporting said frame from said bearings in resilient shear and also resisting relative transverse movement of said frame and said journal bearings in compression.

24. In combination, in a rail truck, a truck frame, an axle assembly including wheels, an axle and axle journal bearings from which said frame is supported, said axle being fixed against axial sliding in said journal bearings, and resilient means for supporting said frame from said journal bearings, comprising metallic load imposing members carried by said frame, metallic load receiving members secured to said journal bearings, rubber cushioning elements between said load imposing and load receiving members, and means for drawing said load imposing and load receiving members toward each other to impose continuous compression on said rubber elements, said load imposing members imposing a shear on said rubber elements in response to vertical loading by said frame and additional compression on said rubber elements in response to lateral motion of said journal bearings and said load receiving members with respect to said frame.

25. In a truck for rail vehicles, a truck frame having an axle, load imposing members secured to said frame, journal bearings for said axle, load receiving members secured to said bearings, and rubber cushioning elements between said load imposing and load receiving members, said rubber resisting the vertical loading of said frame on said bearings in resilient shear.

26. In a truck for rail vehicles, a frame, a plurality of axles having journal bearings from which said frame is supported, and a resilient spring between each of said bearings and said frame comprising a plurality of opposed metallic members, at least one of which is secured to said frame and at least one of which is secured to said bearing, and a rubber cushioning element separating said members, said rubber resisting relative fore and aft and vertical motion in shear and said rubber resisting relative transverse motion in compression.

27. In combination, in a rail vehicle, a truck frame, an axle assembly including an axle and journal bearings from which said frame is supported, said axle being secured in said bearings against axial sliding movement with respect thereto and said bearings being capable of relative transverse movement with respect to said frame, opposed members secured to said frame and said bearings, and elastic cushioning elements between said opposed members through which all lateral movements of said bearings with respect to said frame are transmitted by compression.

28. In combination, in a rail vehicle, a truck frame, an axle assembly including an axle and journal bearings from which said frame is supported, said axle being secured in said bearings against substantial, free axial sliding movement with respect thereto and said bearings being capable of relative transverse movement with respect to said frame, opposed members secured to said frame and said bearings, and rubber cushioning elements between said opposed members through which all lateral movements of said bearings relative to said frame are transmitted by compression.

29. In a truck for rail vehicles, an axle having a journal bearing, shear plates radiating from said bearing, a truck frame having a shear plate secured thereto and extending between the shear plates of said bearing, and rubber cushioning elements between the frame plate and the bearing plates for resisting in shear relative vertical and fore and aft movement of said bearing and frame.

30. In combination in a rail truck, a truck frame, axles having journal bearings from which said frame is sprung, and springs associated with said journal bearings comprising members with parallel surfaces having elastic material therebetween adapted to resist vertical loading imposed by said frame in straight shear.

31. In combination in a rail truck, a truck frame, axles from which said frame is supported, and spring means for supporting said frame from said axles comprising sets of dual springs with one spring of each of said sets residing fore and the other aft of its axle, said springs comprising elastic material arranged to resist vertical loading of said frame on said axles in shear.

32. In combination, a rail truck frame, axles, and journal springs supporting said frame from said axles in longitudinal resiliency, said frame having a load deflection ratio in a longitudinal direction greater than that of said journal springs said journal springs comprising elastic elements adapted to sustain the vertical loading of said frame on said axles in resilient shear.

33. In combination, a rail truck frame, axles, and journal springs supporting said frame from said axles in longitudinal and vertical resiliency, said frame having a load deflection ratio both in a longitudinal and vertical direction substantially greater than that of said journal springs said journal springs comprising elastic elements adapted to sustain the vertical loading of said frame on said axles in resilient shear.

34. In combination, a rail truck frame, axles, and journal springs supporting said frame from said axles in longitudinal, lateral and vertical resiliency, said frame having a load deflection ratio in longitudinal, lateral and vertical directions each substantially greater than that of said journal springs said journal springs comprising elastic elements adapted to sustain the vertical loading of said frame on said axles in resilient shear.

35. In combination, a rail truck, axles upon which said frame is supported, and resilient means for cushioning all lateral movement of said frame on said axles, said frame having a load deflection ratio in a diagonal direction greater than that of said resilient means said journal springs comprising elastic elements adapted to sustain the vertical loading of said frame on said axles in resilient shear.

36. In combination, a rail truck frame, two axles supported on wheels, and journal springs for each of said axles, said axles each being movable to an individual angularity out of the normal relation with said frame, said journal springs individually resisting the longitudinal movement of the ends of said axles therein, said frame having a stiffness in a longitudinal direction considerably greater than that of said springs whereby upon abnormal angularity of one of said axles with said frame the other of said axles may retain its normal direction of travel said journal springs comprising elastic elements adapted to sustain the vertical loading of said frame on said axles in resilient shear.

37. In combination, a rail truck frame, axles supported on wheels, said wheels having a conical tractive surface, journal springs supporting said frame from said axles in longitudinal, vertical and lateral resiliency, said wheels upon displacement of said axles from true center position tending to increase the degree of such displacement, said journal springs yieldingly urging the return of said axles to true center position, thereby equalizing the tractive circumference of said wheels, said frame having a load deflection ratio in every direction greater than that of said springs whereby to resist any tendency of one axle to seek a parallel position with the other axle which is temporarily displaced from true center said journal springs comprising elastic elements adapted to sustain the vertical loading of said frame on said axles in resilient shear.

38. In combination in a rail truck, a frame, axles supported on wheels, said wheels having a conical tractive surface, journal springs supporting said frame from said axles in longitudinal, vertical and lateral resiliency, said frame being of such stiffness as to offer greater resistance in operation to distortion than said springs, said wheels upon displacement of said axles from true normal position with respect to the frame tending to increase the degree of such displacement, said journal springs yieldingly urging the return of said axles to true center position thereby equalizing the radii of the tractive surfaces of said wheels, said journal springs comprising elastic material positioned for resiliency in shear for vertical loading and for resiliency in compression for lateral loading.

39. In a car truck, a truck frame, axles supporting said frame, journal boxes receiving said axles, and means resiliently supporting the frame comprising elastic elements interposed between the axles and frame and respectively longitudinally spaced in their entirety from said axles, said elastic elements including rubber under shear.

40. In a car truck, a truck frame, axles supporting said frame, journal boxes receiving said axles, and means resiliently supporting the frame comprising springing means located fore and aft and in spaced relation with respect to said axles, at least certain of said means comprising rubber under shear.

41. In combination with a car truck having axles, a truck frame mounted on the axles and resilient means interposed between the axles and the frame including rubber under shear for vertical loading and a second spring acting in parallel therewith.

42. In a car truck, a truck frame, axles supporting said frame, journal boxes receiving said axles, and means resiliently supporting the frame comprising springing means located fore and aft and in spaced relation with respect to said axles, at least certain of said means comprising rubber under shear, and in compression normal to the direction of shear.

EMIL H. PIRON.